United States Patent
Chang

[19]

[11] Patent Number: 5,967,184
[45] Date of Patent: Oct. 19, 1999

[54] WATER TEMPERATURE AND FLOW RATE CONTROL DEVICE

[76] Inventor: Chia-Bo Chang, No. 335, Chang-Ting Road, Changhua Hsien, Taiwan

[21] Appl. No.: 08/806,168

[22] Filed: Feb. 26, 1997

[51] Int. Cl.$^6$ .......................... F16K 11/074; F16K 51/00
[52] U.S. Cl. ................................ 137/625.17; 137/625.4; 251/285; 251/288
[58] Field of Search .......................... 137/625.17, 625.4, 137/625.41; 251/285, 288

[56] References Cited

U.S. PATENT DOCUMENTS

| | | | |
|---|---|---|---|
| 3,528,640 | 9/1970 | Smith | 251/285 |
| 3,559,684 | 2/1971 | Rudewick, III | 251/285 X |
| 3,561,728 | 2/1971 | Clarke | 251/285 |
| 3,915,195 | 10/1975 | Manoogian et al. | 251/285 X |
| 3,964,514 | 6/1976 | Manoogian et al. | 137/625.17 X |
| 4,089,347 | 5/1978 | Christo | 137/625.41 |
| 4,313,350 | 2/1982 | Keller, III et al. | 251/285 X |
| 4,397,330 | 8/1983 | Hayman | 137/625.4 X |
| 4,423,752 | 1/1984 | Psarouthakis | 137/625.41 |
| 4,753,418 | 6/1988 | Brotcke | 251/288 |
| 4,813,455 | 3/1989 | Iqbal | 137/625.17 |
| 5,010,917 | 4/1991 | Iqbal | 251/288 X |
| 5,042,529 | 8/1991 | Yeh | 251/288 X |
| 5,303,736 | 4/1994 | Orlandi | 137/625.4 |
| 5,326,075 | 7/1994 | Goff | 251/285 |
| 5,329,958 | 7/1994 | Bosio | 137/625.17 |
| 5,363,880 | 11/1994 | Hsieh | 137/625.17 |
| 5,368,071 | 11/1994 | Hsieh | 137/625.41 |
| 5,386,852 | 2/1995 | Bosio | 137/625.17 |
| 5,402,827 | 4/1995 | Gonzalez | 137/625.17 |
| 5,477,885 | 12/1995 | Knapp | 137/625.41 |
| 5,522,429 | 6/1996 | Bechte et al. | 137/625.17 |
| 5,692,536 | 12/1997 | Tokarz | 251/288 |

FOREIGN PATENT DOCUMENTS

| | | | |
|---|---|---|---|
| 40015 | 3/1929 | Denmark | 251/96 |
| 3038232 | 5/1982 | Germany | 137/625.4 |
| 3822217 | 1/1990 | Germany | 137/625.4 |

*Primary Examiner*—John Rivell
*Assistant Examiner*—Meredith H. Schoenfeld
*Attorney, Agent, or Firm*—Pro-Techtor International Services

[57] ABSTRACT

A water temperature and flow rate control device, including a casing, a rotary cap mounted on the casing to control the horizontal turning angle and vertical tilting angle of a control lever in regulating the temperature of output volume of mixed hot and cold water, and a wedge block adjustably fastened to the control lever and adapted for adjusting the tilting angle of the control lever.

1 Claim, 3 Drawing Sheets

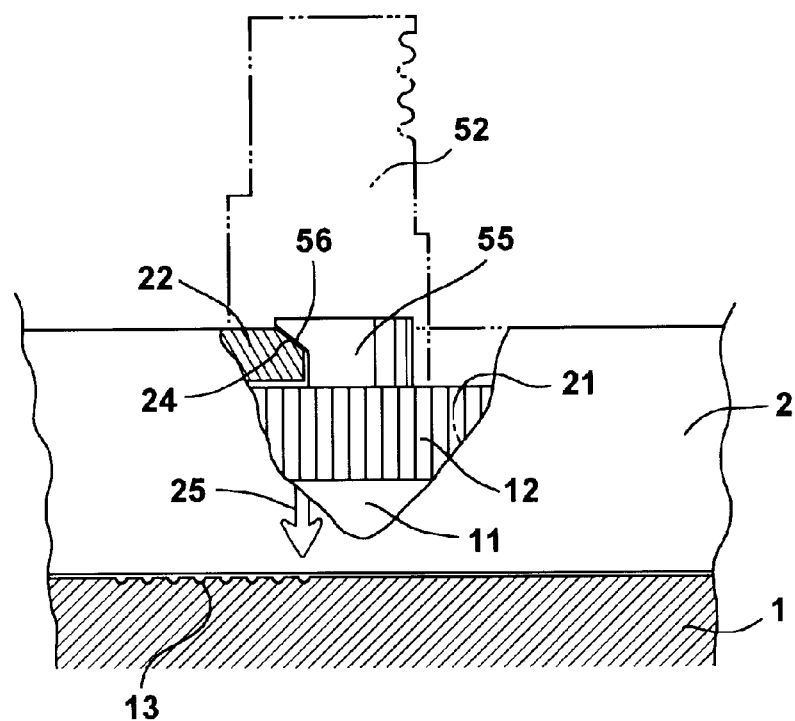
FIG. 3
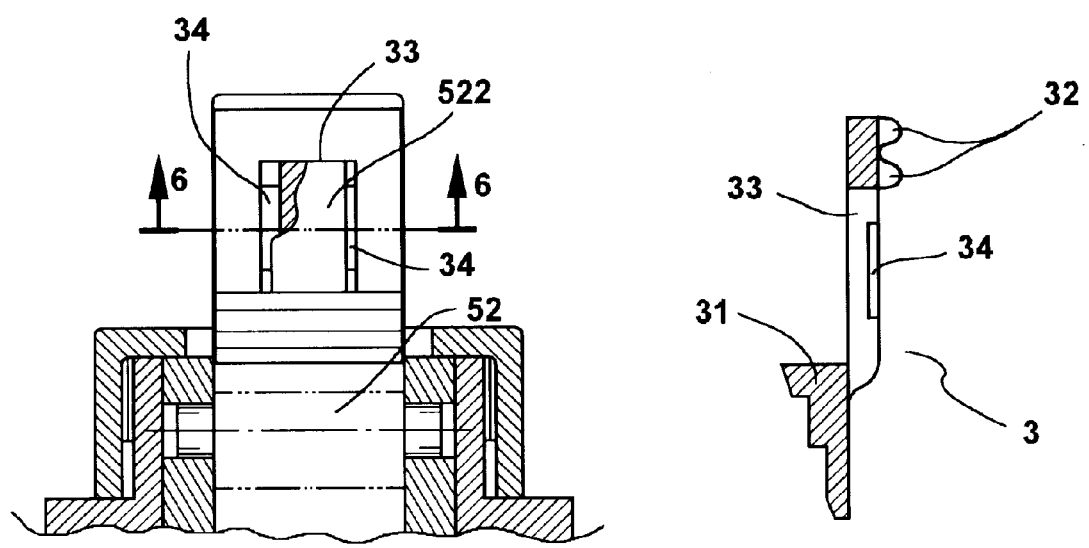
FIG. 5 FIG. 4

5,967,184

WATER TEMPERATURE AND FLOW RATE CONTROL DEVICE

BACKGROUND OF THE INVENTION

The present invention relates to a water temperature and flow rate control device, and more particularly to such a water temperature and flow rate control device uses a rotary cap and a wedge block to limit the horizontal turning angle and vertical tilting angle of a control lever, so as to limit the maximum output volume of water and highest water temperature.

FIG. 7 shows a water temperature and flow rate control device according to the prior art. This structure of water temperature and flow rate control device comprises a casing 10, two ceramic disks 11; 12 arranged in a stack inside the casing 10, a control lever 13 turned about an axis inside the casing 10, an actuating member 14 driven by the control lever 13 to move the one ceramic disk namely the movable ceramic disk 12 relative to the other ceramic disk namely the fixed ceramic disk 11. The fixed ceramic disk 11 has a hot water inlet and a cold water inlet (not shown), and a water outlet 11a. The movable ceramic disk 12 defines a mixing chamber 12a. When the movable ceramic disk 12 is moved relative to the fixed ceramic disk 11, the mixing chamber 12a imparts a water passage between the water outlet 11a and the hot water inlet/cold water inlet, and therefore the temperature and flow rate of water is controlled. According to the aforesaid structure, the control lever 13 is tilted vertically in a tilting angle α to control the communication area between the mixing chamber 12a and the water outlet 11a, so as to control the output volume of water, and turned horizontally in a horizontal turning angle β to control the mixing rate between hot water and cold water, so as to control the temperature of output water. This structure of water temperature and flow rate control device is still not satisfactory in function because the volume and temperature of output water are separately controlled. Because water is allowed to pass out of the device when the control lever 13 is tilted, hot water may flow out of the device to scald the hand when a child play with the device. Further, because the flow rate of a water tap is closely related to the size of the water input and output ports and the pressure of water from the water source, a jet of water may suddenly be driven out of the water temperature and flow rate control device when the cap is control lever is turned horizontally in a rush.

SUMMARY OF THE INVENTION

The present invention has been accomplished to provide a water temperature and flow rate control device which eliminates the aforesaid drawbacks. According to one aspect of the present invention, a rotary cap is provided for limiting the horizontal turning angle of the control lever, to prevent an output of excessively high water temperature when the water flow rate control device is initially opened. According to another aspect of the present invention, an adjustable wedge block is provided to limit the tilting angle of the control lever so as to confine the maximum output volume of water.

BRIEF DESCRIPTION OF THE DRAWINGS

FIG. 3 is a plan view in an enlarged scale of a part of the present invention, showing the relationship between the neck of the casing, the cap, and the control device;

FIG. 4 is a side view in section of a wedge block according to the present invention;

FIG. 5 is a front view of a part of the present invention, showing the wedge block and the control lever coupled together;

DETAILED DESCRIPTION OF THE PREFERRED EMBODIMENT

Figure 2:
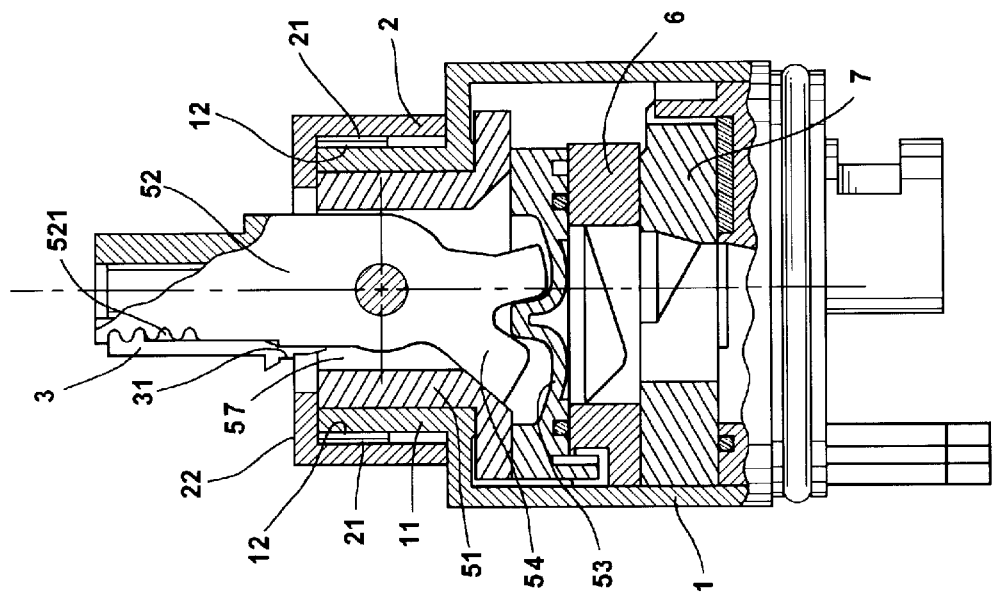
FIG. 2 is a sectional assembly view of the water temperature and flow rate control device shown in FIG. 1.
Figure 1:
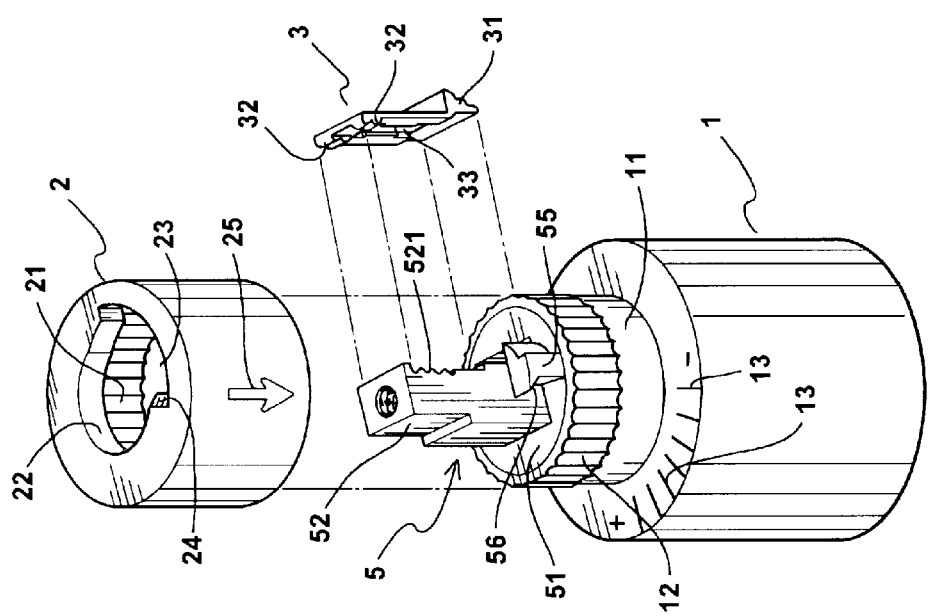
FIG. 1 is an exploded view of a water temperature and flow rate control device according to the present invention.
Figure 7:
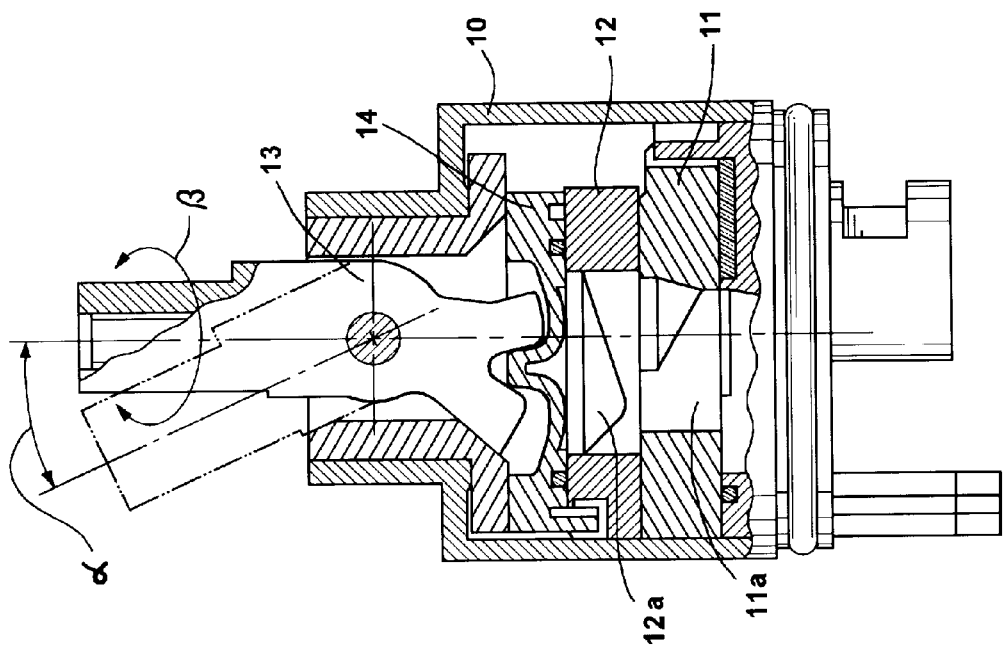
FIG. 7 is a side view in section of a water temperature and flow rate control device according to the prior art.

Referring to FIG. 1, a water temperature and flow rate control device in accordance with the present invention is generally comprised of a casing 1, a cap 2, a wedge block 3, a control device 5, a movable disk 6, and a fixed disk 7.

Referring to FIGS. from 2 to 6 and FIG. 1 again, the casing 1 comprises a tubular neck 11, a toothed portion 12 around the periphery of the tubular neck 11, graduations 13 spaced around the tubular neck 11. The fixed disk 7 is fixedly mounted inside the casing 1 at the bottom. The movable disk 6 is movably mounted inside the casing 1 above the fixed disk 7. The control device 5 is comprised of a hollow mounting base 51 mounted in the tubular neck 11, a control lever 52 pivoted to the mounting base 51 on the inside, an actuating member 53 coupled to the movable disk 6 and moved by the control lever 52, and a stop member 55 raised from the mounting base 51 and having a hooked portion 56. The control lever 52 comprises a serrated portion 521 at one side, a projecting face 522 in the middle defining two dovetail grooves 523, and a forked bottom end 54.

Referring to FIGS. from 1 to 3 again, the cap 2 comprises a toothed portion 21 around the inside wall and meshed with the toothed portion 12 of the casing 1, an inward top flange 22 suspending above the toothed portion 21 and defining a track 23 and a chamfered edge 24 at one end of the track 23. The track 23 imparts a space for the movement of the stop member 55. The chamfered edge 24 is adapted for hooking up with the hooked portion 56 of the stop member 55. Further, the cap 2 is marked with an index 25 adapted for aiming at the graduations 13 of the casing 1. The horizontal turning angle of the control device 5 is limited by means of the inward top flange 22, and the highest water temperature of mixed hot and cold water is confined. When the cap 2 is turned to the highest water temperature position, the chamfered edge 24 is forced into engaged with the hooked portion 56 of the stop member 55, and the cap 2 is prohibited from being forced to disconnect from the stop member 55.

Referring to FIGS. 1, 2, 4 and 5 again, the wedge block 3 comprises a wedged base 31, two serrated portions 32 bilaterally disposed near the top, a center opening 33, and two dovetail projections 34 bilaterally projecting into the center opening 33.

Referring to FIGS. from 1 to 3 again, when the cap 2 is coupled to the neck 11 of the casing 1, the toothed portions 12; 21 are meshed together, the index 25 is aimed at the graduations 13, and the stop member 55 is disposed in the track 23 to limit the turning angle of the cap 2.

Figure 6:
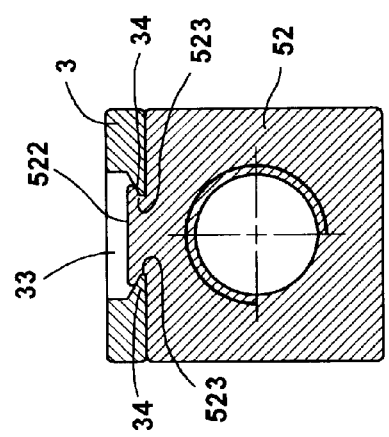
FIG. 6 is a sectional view taken along line 66 of FIG. 5.

Referring to FIGS. 1, 2, 4 and 5 again, the wedge block 3 is fastened to the control lever 52 by forcing the serrated portions 32 and the dovetail projections 34 into engagement with serrated portion 521 and dovetail grooves 523 of the control lever 52 respectively (see FIG. 6). When the wedge block 3 is installed, the wedged base 31 is stopped at one side of the orifice 57 of the hollow mounting base 51 to limit the tilting angle of the control lever 52, so as to confine the maximum water output volume. The maximum water output volume can be adjusted by changing the position of the wedge block 3 relative to the control lever 52.

It is to be understood that the drawings are designed for purposes of illustration only, and are not intended as a definition of the limits and scope of the invention disclosed.

What the invention claimed is:

1. A water temperature and flow rate control device comprising a casing and a rotary cap mounted on said casing and turned to regulate the temperature and output volume of water, and a wedge block for adjusting the control range of said rotary cap, wherein;

said casing comprises an upwardly disposed tubular neck having a toothed portion around the periphery, graduations spaced around said tubular neck, and a control device pivoted to said tubular neck on the inside and driven by said cap to regulate the temperature and output volume of water, said control device comprising a hollow mounting base fixedly mounted within said tubular neck, a control lever turned vertically about an axis in said hollow mounting base and horizontally with said cap to regulate the water temperature and flow rate of output water, and a stop member raised from said hollow mounting base, said control lever comprising a serrated portion at one side, and a projecting face in the middle defining two dovetail grooves;

said wedge block comprises a wedged base adapted for limiting the tilting angle of said control lever, two serrated portions bilaterally disposed near the top and forced into engagement with the serrated portion of said control lever, a center opening, and two dovetail projections bilaterally projecting into said center opening and forced into engagement with the dovetail grooves of said control lever;

said cap comprises a toothed portion raised around an inside wall thereof and meshed with the toothed portion of the tubular neck of said casing, an inward top flange suspending above the toothed portion of said cap and defining a track and a chamfered edge at one end of said track, and an index for the graduations of said casing, said track receiving said stop member and moved relative to it to limit the horizontal rotating angle of the control lever of said control device in limiting the maximum water temperature of mixed output water.

\* \* \* \* \*